(12) United States Patent
Masuda

(10) Patent No.: US 12,476,865 B2
(45) Date of Patent: Nov. 18, 2025

(54) FAILURE DETECTION SYSTEM, FAILURE RECOVERY SYSTEM, FAILURE DETECTION METHOD, AND NON-TRANSITORY COMPUTER READABLE MEDIUM

(71) Applicant: NEC Corporation, Tokyo (JP)

(72) Inventor: Tomotaka Masuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 450 days.

(21) Appl. No.: 17/926,690

(22) PCT Filed: May 21, 2021

(86) PCT No.: PCT/JP2021/019422
§ 371 (c)(1),
(2) Date: Nov. 21, 2022

(87) PCT Pub. No.: WO2021/241454
PCT Pub. Date: Dec. 2, 2021

(65) Prior Publication Data
US 2023/0198831 A1    Jun. 22, 2023

(30) Foreign Application Priority Data
May 27, 2020   (JP) ................................ 2020-092028

(51) Int. Cl.
*H04L 12/00* (2006.01)
*H04L 41/0631* (2022.01)
(Continued)

(52) U.S. Cl.
CPC ...... *H04L 41/0677* (2013.01); *H04L 41/0631* (2013.01); *H04L 41/0663* (2013.01); *H04L 41/069* (2013.01)

(58) Field of Classification Search
CPC ............ H04L 41/0677; H04L 41/0631; H04L 41/0663; H04L 41/069; H04L 43/08;
(Continued)

(56) References Cited

U.S. PATENT DOCUMENTS

| 7,743,274 B2 * | 6/2010 | Langford | ............ G06F 11/0748 714/4.1 |
| 2009/0070639 A1 * | 3/2009 | Langford | ............... G06F 11/079 714/E11.003 |

(Continued)

FOREIGN PATENT DOCUMENTS

| JP | 2002-271392 A | 9/2002 |
| JP | 2011-146982 A | 7/2011 |

(Continued)

OTHER PUBLICATIONS

International Search Report for PCT Application No. PCT/JP2021/019422, mailed on Jul. 20, 2021.

(Continued)

*Primary Examiner* — Frantz Coby
(74) *Attorney, Agent, or Firm* — Sughrue Mion, PLLC

(57) ABSTRACT

Provided are a failure detection system, a failure recovery system, a failure detection method, and a non-transitory computer readable medium that are capable of more easily estimating a degradation location of QoE. A failure detection system (10) is provided with a log collection unit (12) that collects a communication log including communication quality information from a relay device that terminates TCP communication, and a degradation estimation unit (16) that estimates, by using the communication quality information of the collected communication log, a degradation point indicating a point where a communication quality degradation factor exists in a communication path passing through the relay device.

8 Claims, 14 Drawing Sheets

(51) Int. Cl.
 *H04L 41/0663* (2022.01)
 *H04L 41/0677* (2022.01)
 *H04L 41/069* (2022.01)
(58) Field of Classification Search
 CPC ... H04L 43/04; H04L 43/091; H04L 41/0659; H04L 47/00
 USPC .......................................................... 370/225
 See application file for complete search history.

(56) References Cited

U.S. PATENT DOCUMENTS

| | | | |
|---|---|---|---|
| 2015/0143184 A1* | 5/2015 | Suzuki | H04L 45/22 714/48 |
| 2016/0241465 A1* | 8/2016 | Hasegawa | H04L 45/28 |

FOREIGN PATENT DOCUMENTS

| | | | | |
|---|---|---|---|---|
| JP | 2011-250234 A | 12/2011 | | |
| JP | 2014-107825 A | 6/2014 | | |
| JP | 2017-046108 A | 3/2017 | | |
| JP | 2018-029219 A | 2/2018 | | |
| JP | 2018121232 A | * 8/2018 | ............. | H04L 12/00 |
| JP | 2019-022187 A | 2/2019 | | |
| JP | 6502062 B2 | * 4/2019 | ............. | H04L 12/00 |
| WO | 2019/244966 A1 | 12/2019 | | |

OTHER PUBLICATIONS

Tomohiko Ogishi et al., "Proposal of Methodology to Analyze Network Quality for Aggregated Paths Using Passive Traffic Measurement", IEICE technical report, vol. 101, No. 186, pp. 75-82, section 3, Jul. 2001.

JP Office Communication for JP Application No. 2022-526999, mailed on Jan. 9, 2024 with English Translation.

JP Office Action for JP Application No. 2022-526999, mailed on Aug. 22, 2023 with English Translation.

* cited by examiner

FAILURE DETECTION SYSTEM, FAILURE RECOVERY SYSTEM, FAILURE DETECTION METHOD, AND NON-TRANSITORY COMPUTER READABLE MEDIUM

This application is a National Stage Entry of PCT/JP2021/019422 filed on May 21, 2021, which claims priority from Japanese Patent Application 2020-092028 filed on May 27, 2020, the contents of all of which are incorporated herein by reference, in their entirety.

TECHNICAL FIELD

The present disclosure relates to a failure detection system, a failure recovery system, a failure detection method, and a non-transitory computer readable medium.

BACKGROUND ART

Methods for detecting failures in a network and specifying a degradation location are known. For example, a method for detecting a failure location by confirming presence of a failure by using a failure log, or by confirming a communication state of pseudo communication by using a probe for failure detection or alive monitoring using software such as ping is known. However, such a method is not able to detect a degraded state of quality of experience (QoE) in user communications which are affected by various conditions such as place, radio wave condition, and terminal, when an obvious failure state has not been reached. There is also a scheme for monitoring traffic in a layer of L3 or lower such as a router, whereby a flow of communication can be confirmed but the degraded state of QoE cannot be confirmed. However, since degradation of QoE causes a large influence on the user communication even though it is not an obvious failure state, detection of a degraded state of the QoE and specification of a degradation location is required.

Therefore, Patent Literature 1 discloses a network system that specifies, based on flow information of a communication flow being a control unit between terminals, a communication quality degradation location on a communication path through which the communication flow passes.

CITATION LIST

Patent Literature

[Patent Literature 1] Japanese Unexamined Patent Application Publication No. 2017-046108

SUMMARY OF INVENTION

Technical Problem

However, in the network system described in Patent Literature 1, header information of a packet belonging to a communication flow is analyzed for each communication flow, flow information is generated based on the analysis result, and an index necessary for specifying a degradation location is calculated based on the flow information. Therefore, there is a problem that processing of specifying the degradation location is complicated.

In view of the problem described above, an object of the present disclosure is to provide a failure detection system, a failure recovery system, a failure detection method, and a non-transitory computer readable medium that are able to more easily estimate a degradation location of QoE.

Solution to Problem

A failure detection system according to one aspect of the present disclosure includes: a log collection means for collecting a communication log including communication quality information from a relay device that terminates transmission control protocol (TCP) communication; and a degradation estimation means for estimating, by using the communication quality information of the collected communication log, a degradation point indicating a point where a communication quality degradation factor exists in a communication path passing through the relay device.

A failure recovery system according to one aspect of the present disclosure includes: a failure detection device including a log collection means for collecting a communication log including communication quality information from a relay device that terminates TCP communication, and a degradation estimation means for estimating, by using the communication quality information of the collected communication log, a degradation point indicating a point where a communication quality degradation factor exists in a communication path passing through the relay device; and a failure recovery device configured to switch the communication path to a bypass route that does not pass through the estimated degradation point.

A failure detection method according to one aspect of the present disclosure includes: collecting a communication log including communication quality information from a relay device that terminates TCP communication; and estimating, by using the communication quality information of the collected communication log, a degradation point indicating a point where a communication quality degradation factor exists in a communication path passing through the relay device.

A non-transitory computer readable medium according to one aspect of the present disclosure stores a failure detection program causing a computer to execute a failure detection method. The failure detection method includes collecting a communication log including communication quality information from a relay device that terminates TCP communication, and estimating, by using the communication quality information of the collected communication log, a degradation point indicating a point where a communication quality degradation factor exists in a communication path passing through the relay device.

Advantageous Effects of Invention

According to the present disclosure, a failure detection system, a failure recovery system, a failure detection method, and a non-transitory computer readable medium that are able to more easily estimate a degradation location of QoE can be provided.

EXAMPLE EMBODIMENT

Figure 1:
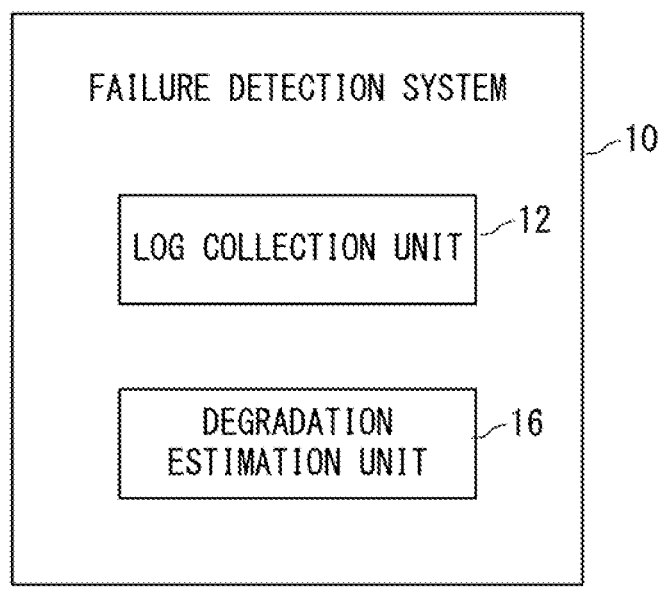
FIG. 1 is a block diagram illustrating a configuration of a failure detection system according to a first example embodiment.

Hereinafter, the present disclosure will be described through example embodiments, but the disclosure according to the claims is not limited to the following example embodiments. Also, not all of the configurations described in the example embodiments are indispensable as a means for solving the problems. In the drawings, the same elements are denoted by the same reference signs, and a repetitive description thereof is omitted as necessary.

First Example Embodiment

First, a first example embodiment of the present disclosure will be described with reference to FIG. 1. FIG. 1 is a block diagram illustrating a configuration of a failure detection system 10 according to the first example embodiment. The failure detection system 10 includes a log collection unit 12 and a degradation estimation unit 16.

The log collection unit 12 is also called a log collection means. The log collection unit 12 collects a communication log including communication quality information from a relay device that terminates transmission control protocol (TCP) communication.

The degradation estimation unit 16 is also called a degradation estimation means. The degradation estimation unit 16 estimates, using the communication quality information of the communication log collected by the log collection unit 12, a degradation point in a communication path passing through the relay device. Herein, the degradation point indicates a point where a communication quality degradation factor exists.

As described above, according to the first example embodiment, the failure detection system 10 is able to easily estimate the communication quality degradation point by using the communication quality information of the communication log included in the relay device that terminates the TCP communication.

Second Example Embodiment

Figure 2:
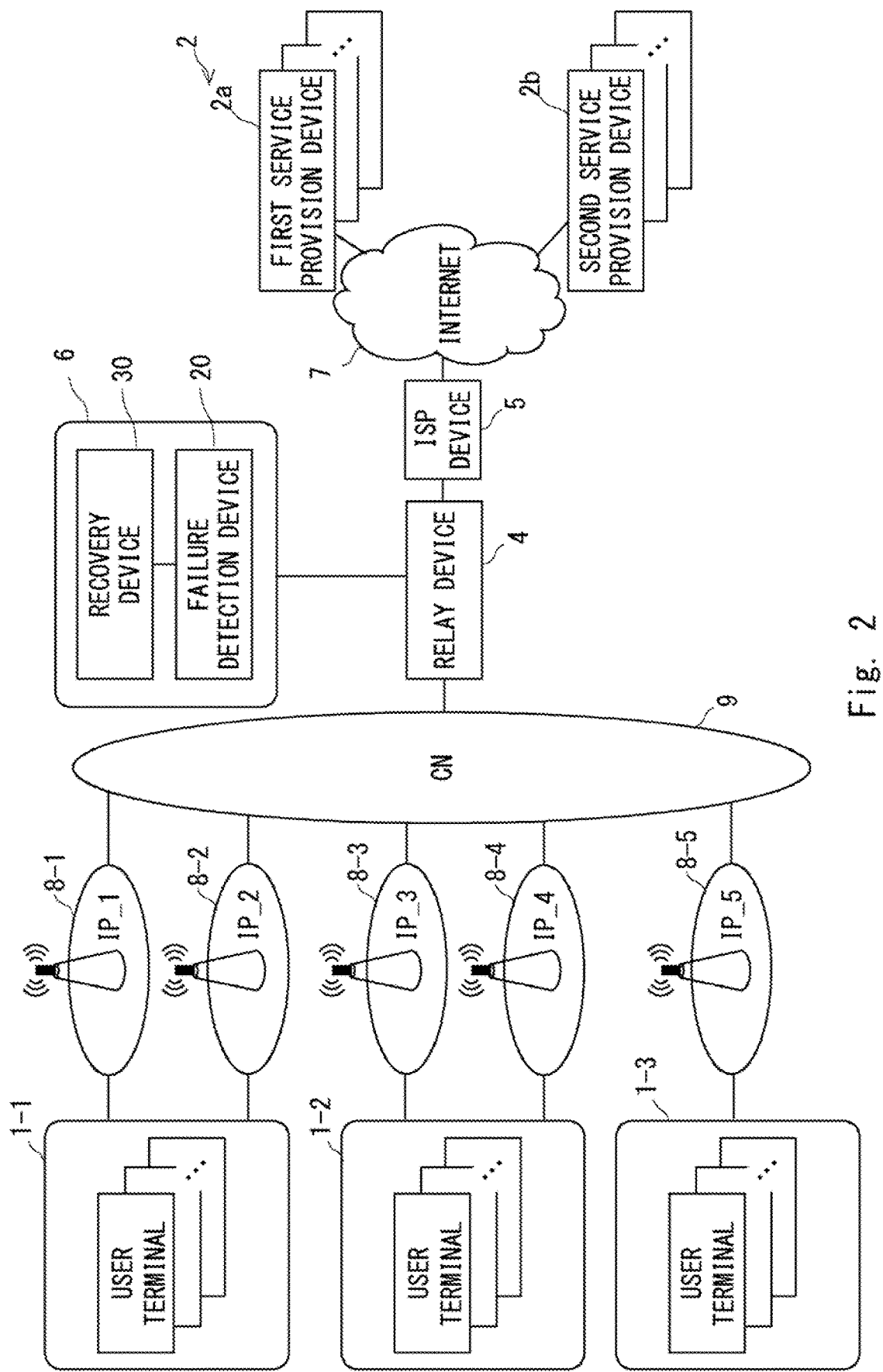
FIG. 2 is a diagram illustrating one example of a configuration of a communication system to which a failure recovery system according to a second example embodiment is applied.

Next, a second example embodiment of the present disclosure will be described with reference to FIGS. 2 to 10. FIG. 2 is a diagram illustrating one example of a configuration of a communication system to which a failure recovery system 6 according to the second example embodiment is applied. The communication system according to the second example embodiment is a system that enables a user terminal to use various services via the Internet. The communication system includes a user terminal 1, a service provision device 2, a relay device 4, an Internet service provider (ISP) device 5, and the failure recovery system 6.

The communication system is configured in such a way that the user terminal 1 and the relay device 4 are communicably connected via a radio access network (RAN) 8 and a core network (CN) 9. In the second example embodiment, the RAN 8 and the CN 9 are provided by a mobile network operator (MNO). Note that the RAN 8 is constructed by a base station.

Further, the communication system is configured in such a way that the service provision device 2, the relay device 4, and the ISP device 5 are communicably connected via the Internet 7.

The user terminal 1 is a personal computer, a notebook computer, a cellular phone, a smart phone, or other communication terminals or the like capable of inputting and outputting data. In the second example embodiment, the user terminal 1 is a mobile communication terminal capable of wireless communication. The user terminal 1 performs wireless communication with the base station, requests the service provision device 2 to provide a service via the RAN 8, the CN 9, and the Internet 7, and receives data related to the service from the service provision device 2.

For example, as illustrated in the present figure, one or a plurality of user terminals 1-1 wirelessly communicate with a base station that constructs RAN 8-1 or RAN 8-2. Further, one or a plurality of user terminals 1-2 wirelessly communicate with a base station constructing the RAN 8-3 or the RAN 8-4. Further, one or a plurality of user terminals 1-3 wirelessly communicate with a base station that constructs the RAN 8-5.

The service provision device 2 is a computer such as a server computer that provides a service to the user terminal 1. For example, in response to a request from the user terminal 1, the service provision device 2 provides a web content service such as a moving image and a voice, a voice call service, a video call service, and the like. In the second example embodiment, the service provision device 2 includes one or a plurality of first service provision devices 2a and one or a plurality of second service provision devices 2b.

The first service provision device 2a is a device that provides an over-the-top (OTT) operated by a carrier different from the ISP or the network operator. The OTT is known to use a large amount of communication capacity.

The second service provision device 2b is a device being connected to a content delivery network (CDN) (not illustrated) and providing a web content service.

Note that, the kinds of the service provision device 2 is not limited to two, and may be one, or two or more.

The relay device 4 is a relay device such as a switch or a gateway. The relay device 4 relays data communication between the user terminal 1 and the service provision device 2 via the Internet 7 and the CN 9. The relay device 4 is connected to the CN 9, and also communicably connected to the ISP device 5. Herein, the relay device 4 performs processing for terminating TCP communication on the user terminal 1 side and the service provision device 2 side, and outputs a communication log related to the TCP communication. The communication log output by the relay device 4 includes communication quality information related to QoE, unlike the communication log output by an L3 switch such as a router. The communication log and the communication quality information will be described later.

The ISP device 5 is a device managed by an ISP operator. The ISP device 5 is connected to the Internet 7 and communicably connected to the relay device 4, and relays these communications.

The failure recovery system 6 is a system that detects degradation of the communication quality of the communication system and switches the communication path used by the user terminal 1 to a communication path that does not pass through the degradation point. The failure recovery system 6 includes a failure detection system (hereinafter referred to as a failure detection device) 20 and a recovery device 30.

The failure detection device 20 is a computer such as a server computer connected to the relay device 4. The failure detection device 20 analyzes, using the communication log of the relay device 4, the state of QoE of the user, detects the degradation of the communication quality, and estimates the degradation point in the communication system. In the present figure, the failure detection device 20 is illustrated as being connected to one relay device 4 for convenience, but it is assumed that the failure detection device 20 is connected to a plurality of relay devices 4.

The recovery device 30 is also called a failure recovery device. The recovery device 30 is a computer such as a server computer connected to the failure detection device 20. When the communication path used by the user terminal 1 passes through the degradation point, the recovery device 30 switches the communication path to a bypass route that does not pass through the estimated degradation point.

Herein, one example of an occurrence of a failure will be described. For example, a case where a failure occurs in which communication connection becomes difficult due to aging of an interface portion of a router in the CN 9 is considered. It is assumed that the router is on the route of IP to be delivered in a specific area. Such a failure does not completely cut off the communication connection between the user terminal 1 and the service provision device 2, but may cause a packet loss state, and thus causes a retransmission in the communication. For example, when a user is playing an online game, the packet loss state causes a state abnormality on the online game, which affects the user in such a way as disabling comfortable play of the online game. In addition, such a failure causes degradation of transmission efficiency. However, since a failure log is not output in the device of the communication system, a system maintainer cannot recognize such an abnormality by the failure log. Further, since the communication itself has succeeded and packet loss does not occur continuously, the abnormality cannot be detected even by route monitoring by a probe.

In such a case, generally, the system maintainer recognizes that an abnormality has occurred by a report from the user. Then, the system maintainer maps and narrows down the area where the abnormality has occurred and the location in the subject, such as the online game, where the abnormality has occurred, based on reports from a plurality of users, and performs separation of the degradation points. Herein, in order to perform narrowing down with high accuracy, it is required that a large number of users who experienced occurrence of abnormalities report. However, in reality, since there is a low possibility that a large number of users report, and it is difficult to clearly narrow down the location of occurrence of an abnormality, the log of each device is checked to confirm that there is no abnormality, and then the devices are separated one by one, thereby specifying the degradation point. In such a method, it takes extremely long time to specify the degradation point, and the recovery time becomes long. Further, with the complexity of networks in recent years, the problem is expected to become more serious in terms of both man-hours and recovery time.

However, according to the second example embodiment, the failure detection device 20 of the failure recovery system 6 first collects the communication log including the communication quality information acquired by the relay device 4, and detects that the communication quality has degraded by communication using a specific IP address as an example. Since there is a possibility that there is an abnormality in the network route through which the IP packet passes, the recovery device 30 of the failure recovery system 6 suppresses the payout of the target IP address, assigns another IP address, and performs the route change. As a result, since the failure recovery system 6 automatically switches the route before the user report occurs, it is possible to minimize the influence on the user. Thereafter, the system maintainer confirms the abnormality of the separated device.

Figure 3:
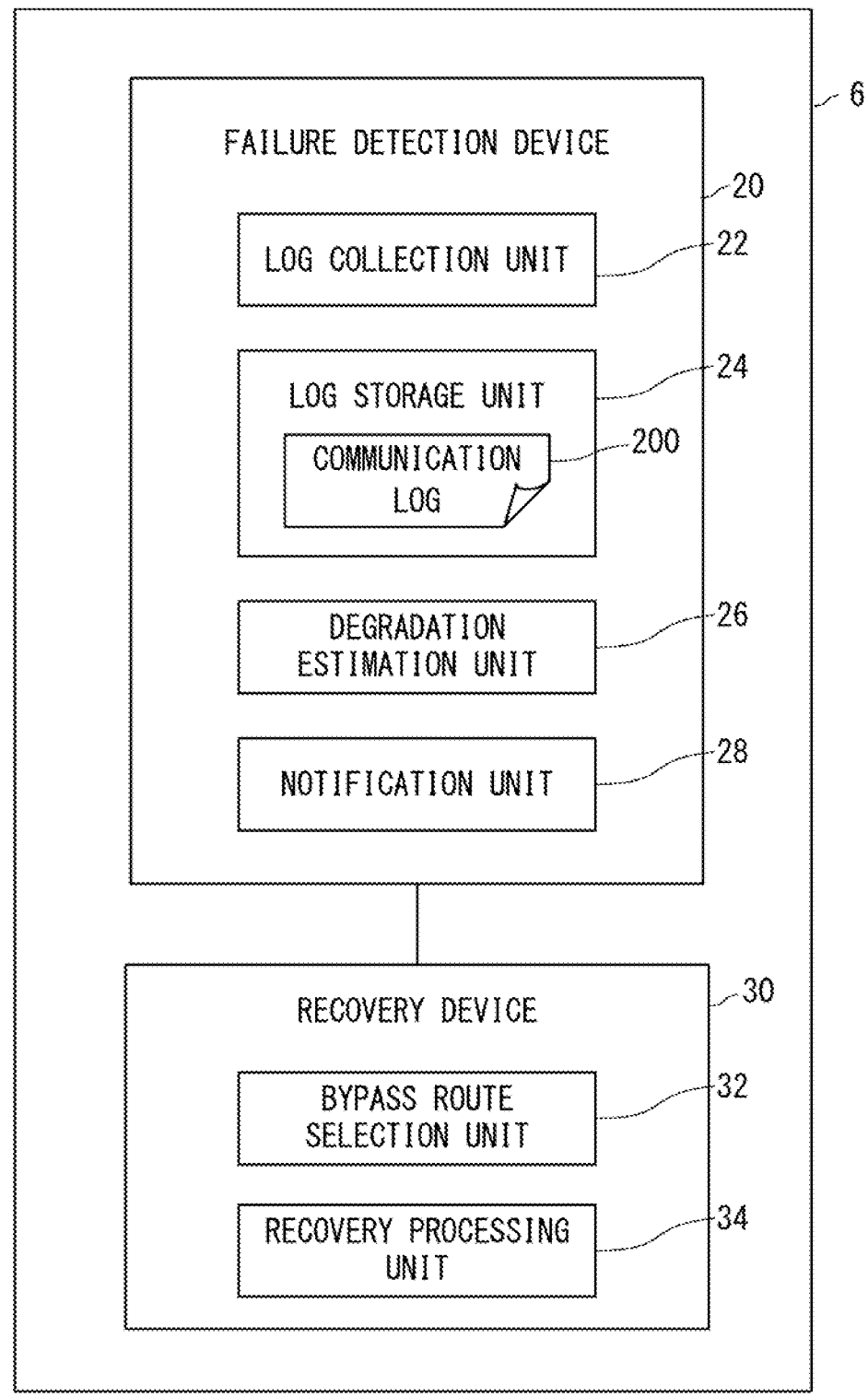
FIG. 3 is a block diagram illustrating one example of a configuration of the failure recovery system according to the second example embodiment.

FIG. 3 is a block diagram illustrating one example of the configuration of the failure recovery system 6 according to the second example embodiment. As described above, the failure recovery system 6 includes the failure detection device 20 and the recovery device 30.

The failure detection device 20 includes a log collection unit 22, a log storage unit 24, a degradation estimation unit 26, and a notification unit 28.

The log collection unit 22 is one example of the log collection unit 12. The log collection unit 22 receives and collects the communication log 200 from each of the plurality of relay devices 4. The log collection unit 22 stores the communication log 200 in the log storage unit 24.

The log storage unit 24 is also called a log storage means. The log storage unit 24 is a storage medium that stores the communication log 200 collected by the log collection unit 22.

The degradation estimation unit 26 is one example of the degradation estimation unit 16. The degradation estimation unit 26 analyzes the communication quality information of the communication log 200 collected by the log collection unit 22 and stored in the log storage unit 24, and specifies the relay device 4 in the communication quality degraded state. Then, the degradation estimation unit 26 estimates, using the communication log 200 collected from the specified relay device 4, the degradation point in the communication path passing through the specified relay device 4.

The notification unit 28 is also called a notification means. In response to the estimation of the degradation point, the notification unit 28 notifies a bypass route selection unit 32 of the recovery device 30 of the degradation information related to the degradation point.

The recovery device 30 includes the bypass route selection unit 32 and a recovery processing unit 34.

The bypass route selection unit 32 is also called a bypass route selection means. In response to receiving the degradation information from the notification unit 28, the bypass route selection unit 32 calculates a bypass route that does not pass through the degradation point for the target communication having the communication route that passes through the degradation point.

The recovery processing unit 34 is also called a recovery processing means. The recovery processing unit 34 performs processing for switching the communication route of the target communication to the bypass route calculated by the bypass route selection unit 32. For example, the recovery processing unit 34 changes the access point name (APN) of the user terminal 1 or changes the route in the CN 9.

Figure 4:
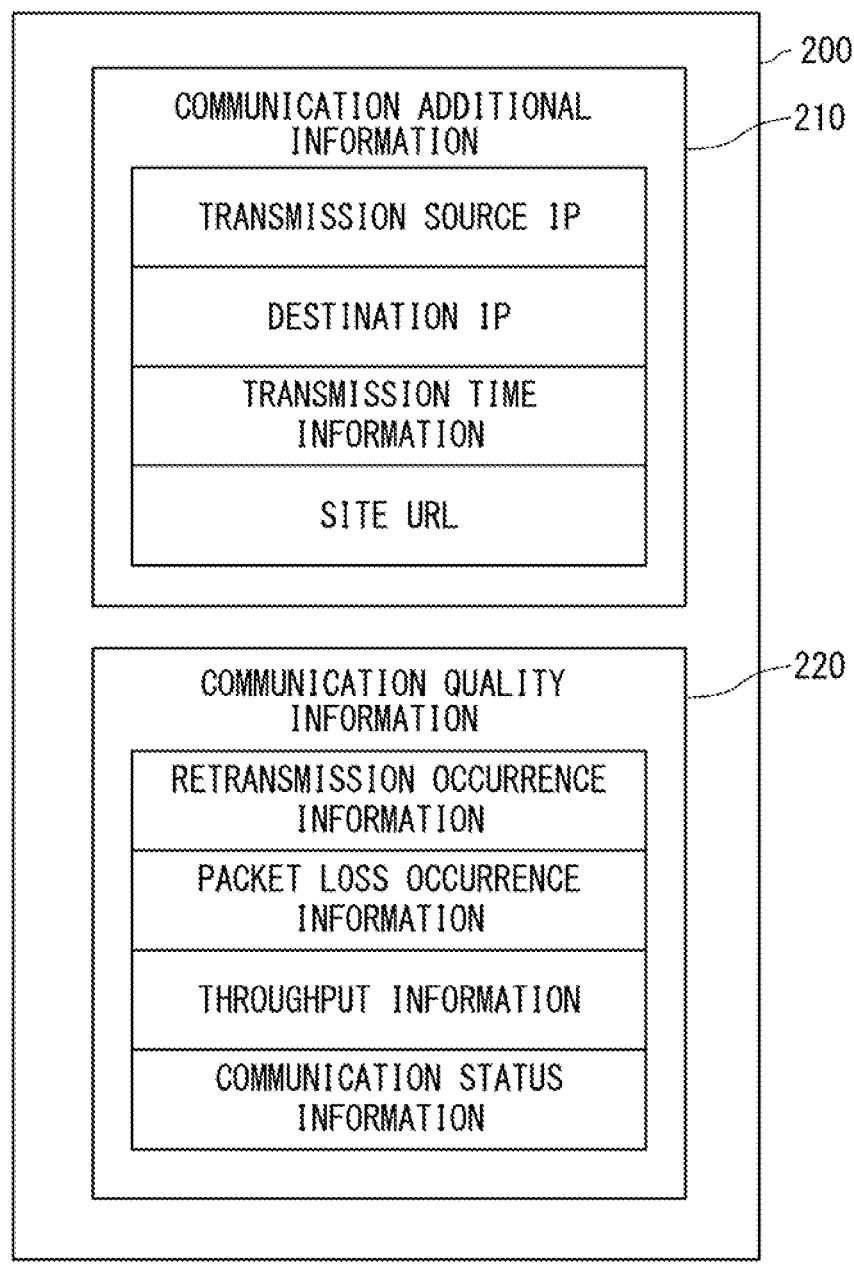
FIG. 4 is a diagram illustrating one example of a data structure of a communication log according to the second example embodiment.

FIG. 4 is a diagram illustrating one example of a data structure of the communication log 200 according to the second example embodiment. The communication log 200 includes communication additional information 210 and communication quality information 220.

The communication additional information 210 includes plurality of types of control information relating to transmission/reception of data. For example, the communication additional information 210 includes at least two pieces of information from among address information of a transmission source, address information of a destination, and identification information of an accessed site. Note that, in the second example embodiment, as one example, the communication additional information 210 includes an IP address of a transmission source, an IP address of a destination, transmission time information, and a uniform resource locator (URL) of a site, as illustrated in the present figure.

The communication quality information 220 is information related to communication quality. The communication quality information 220 includes at least one of retransmission occurrence information, packet loss occurrence information, and throughput information. The communication quality information 220 may include round trip time (RTT) information. Note that, in the second example embodiment, the communication quality information 220 includes communication status information in addition to retransmission occurrence information, the packet loss occurrence information, and the throughput information.

The communication status information is a status code in site communication, and includes an error code when an error occurs.

Note that the end-to-end performance index information such as throughput information or RTT information is information acquired by the relay device 4 terminating the TCP communication.

Figure 5:
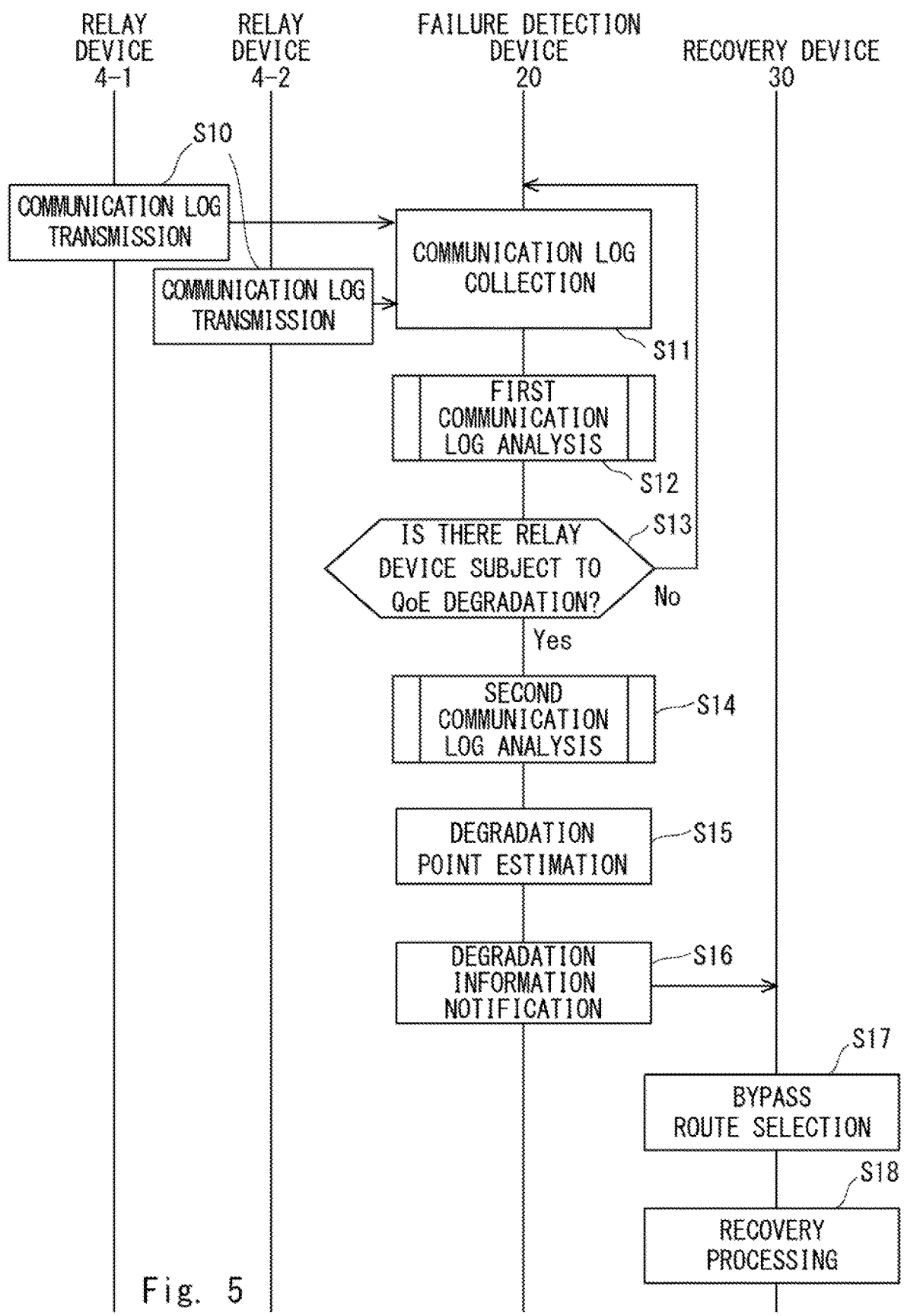
FIG. 5 is a sequence diagram illustrating one example of an operation of the communication system according to the second example embodiment.

Next, the operation of the communication system according to the second example embodiment will be described with reference to FIGS. 5 to 10. FIG. 5 is a sequence diagram illustrating one example of the operation of the communication system according to the second example embodiment.

First, each of the relay devices 4-1 and 4-2 transmits the communication log 200 of the TCP communication terminated by the relay devices 4-1 and 4-2 to the failure detection device 20 of the failure recovery system 6 (S10). Thereby, the log collection unit 22 of the failure detection device 20 collects the communication log 200 by receiving the communication log 200 from the relay devices 4-1 and 4-2 and storing the communication log 200 in the log storage unit 24 (S11).

Next, the degradation estimation unit 26 of the failure detection device 20 performs a first communication log analysis on the communication log 200 stored in the log storage unit 24 (S12). Thereby, the failure detection device 20 detects the degradation of the QoE of the communication relayed by the relay device 4, with respect to each of the relay devices 4 included in the communication system.

Next, the degradation estimation unit 26 of the failure detection device 20 determines whether there is a relay device 4 (target relay device) that relays the communication in which the QoE is degraded, among the relay devices 4 included in the communication system (S13). If it is determined that a target relay device is present (Yes in S13), the degradation estimation unit 26 advances the processing to S14, and if not (No in S13), returns the processing to S11.

The processing illustrated in S12 and S13 may be performed periodically.

In response to the determination that the target relay device is present, the degradation estimation unit 26 performs a second communication log analysis on the communication log 200 collected from the target relay device (S14). Thereby, the degradation estimation unit 26 estimates the degradation point on the communication path of the communication relayed by the target relay device (S15). Then, the notification unit 28 of the failure detection device 20 notifies the bypass route selection unit 32 of the recovery device 30 of the degradation information relating to the degradation point (S16). In addition, the notification unit 28 may also notify the degradation information to the system maintainer.

In response to receiving the degradation information, the bypass route selection unit 32 of the recovery device 30 calculates and selects a bypass route that does not pass through the degradation point for the target communication having the communication route that passes through the degradation point (S17).

The recovery processing unit 34 of the recovery device 30 changes the communication path of the target communication to the selected bypass route, and performs the recovery processing of the abnormality (S18). For example, a case where the failure detection device 20 detects that the communication using the RAN 8-1 (APN: IP_1) illustrated in FIG. 2 has a slightly higher packet loss rate and a lower throughput than the communication using the other RAN 8 is considered. In this case, the recovery processing unit 34 changes the APN of the user terminal 1 using the RAN 8-1 (IP_1→IP_2) so that the communication of the user terminal 1 is accommodated in another base station. As a result, the user terminal 1 is able to use the service from the service provision device 2 through another communication path that does not pass through the degradation point.

Figure 6:
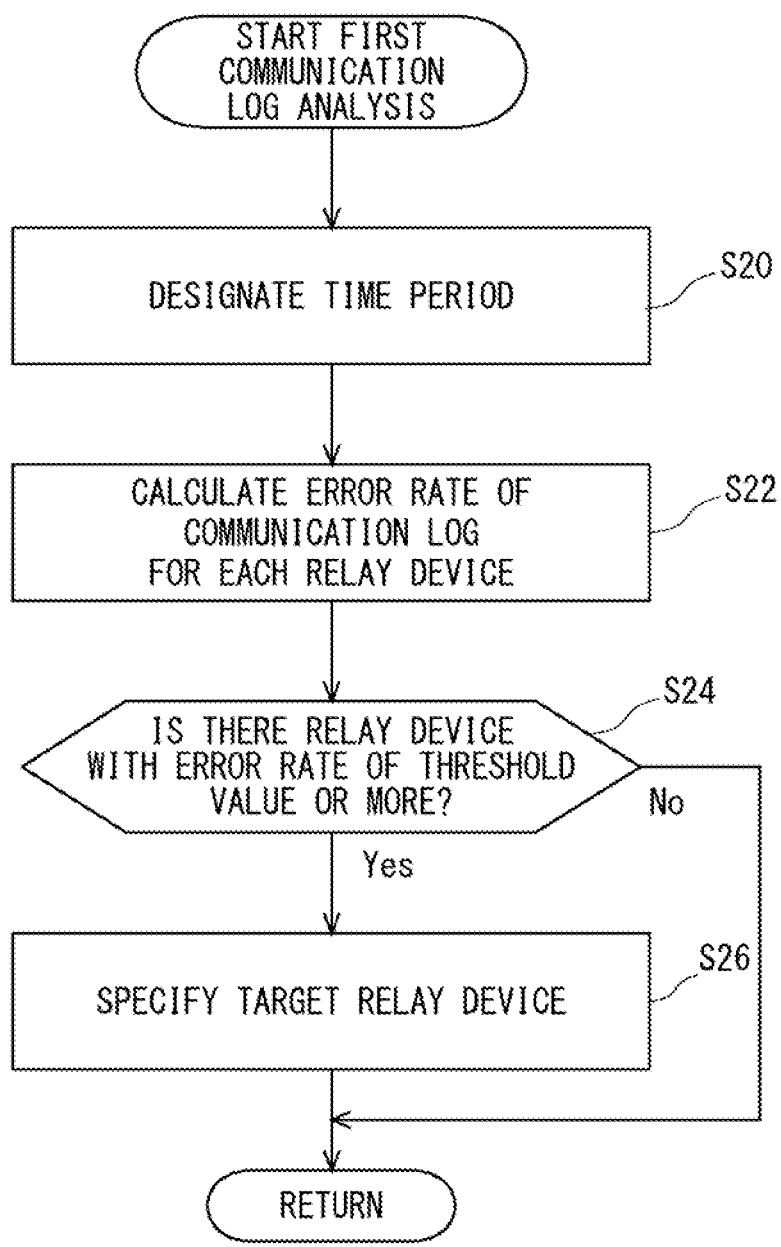
FIG. 6 is a flowchart illustrating one example of first communication log analysis processing of the failure detection device according to the second example embodiment.
Figure 7:
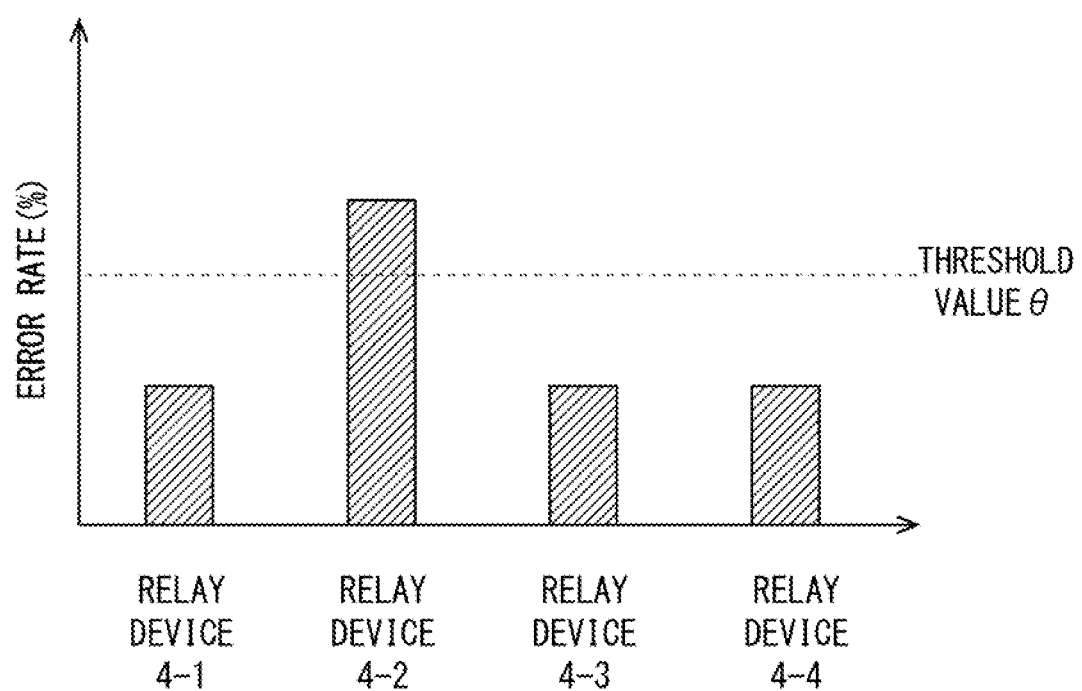
FIG. 7 is a diagram for describing the first communication log analysis processing according to the second example embodiment.

Next, first communication log analysis processing of the failure detection device 20 according to the second example embodiment will be described using FIG. 6, and with reference to FIG. 7. FIG. 6 is a flowchart illustrating one example of the first communication log analysis processing of the failure detecting device 20 according to the second example embodiment. FIG. 7 is a diagram for describing the first communication log analysis processing according to the second example embodiment.

First, the degradation estimation unit 26 of the failure detection device 20 designates an analysis target period T indicating a period to be analyzed (S20). For example, the degradation estimation unit 26 may designate the most recent hour as the analysis target period T. The analysis target period T may be determined in advance. The analysis target period T may be determined when the failure detection device 20 receives an input from the system maintainer.

Next, the degradation estimation unit 26 calculates, for each of the relay devices 4 in the communication system, an error rate during the analysis target period T of the communication log 200 collected from each of the relay devices 4 (S22). Herein, the error rate indicates a rate of communication in which an error has occurred in site communication. In the second example embodiment, the error rate may indicate a rate of the amount of communication data corresponding to the communication log 200 in which the error code is included in the communication status information of the communication quality information 220, among the amount of communication data relayed by the relay device 4.

Next, the degradation estimation unit 26 determines whether there is a relay device 4 the error rate of which is equal to or greater than a predetermined threshold value (S24). When it is determined that there is a relay device 4 the error rate of which is equal to or greater than the threshold value (Yes in S24), the degradation estimation unit 26 specifies such relay device 4 as the target relay device (S26). Then, the degradation estimation unit 26 advances the processing to S13 illustrated in FIG. 5. Meanwhile, when the degradation estimation unit 26 determines that there is no relay device 4 the error rate of which is equal to or greater than the threshold value (No in S24), the processing is proceeded to S13 illustrated in FIG. 5.

Herein, as illustrated in FIG. 7, a case where the failure detection device 20 collects the communication log 200 from relay devices 4-1 to 4-4 is considered. For example, the degradation estimation unit 26 designates a period from 10 o'clock to 11 o'clock on a predetermined day as the analysis target period T. The degradation estimation unit 26 calculates the error rate of the analysis target period T for each relay device 4 using the transmission time information of the communication additional information 210 of the communication log 200 and the communication status information of the communication quality information 220. Herein, the degradation estimation unit 26 specifies the relay device 4-2 the error rate of which is equal to or greater than the threshold value θ as the target relay device.

Note that, in the second example embodiment, the degradation estimation unit 26 uses the error rate in the first communication log analysis processing, but instead of this, an error data amount indicating the amount of communication data in which some error has occurred in the site communication may be used. The error data amount may be a data amount of communication corresponding to the communication log 200 in which the error code is included in the communication status information of the communication quality information 220.

Further, instead of comparing the error rate of the analysis target period T between the relay devices 4, the degradation estimation unit 26 may compare the average of the past error rates in the same time period as the analysis target period T with the error rate of the analysis target period T for each relay device 4. When there is a relay device 4 that is significantly different from the past average, the degradation estimation unit 26 may specify such relay device 4 as the target relay device.

Figure 8:
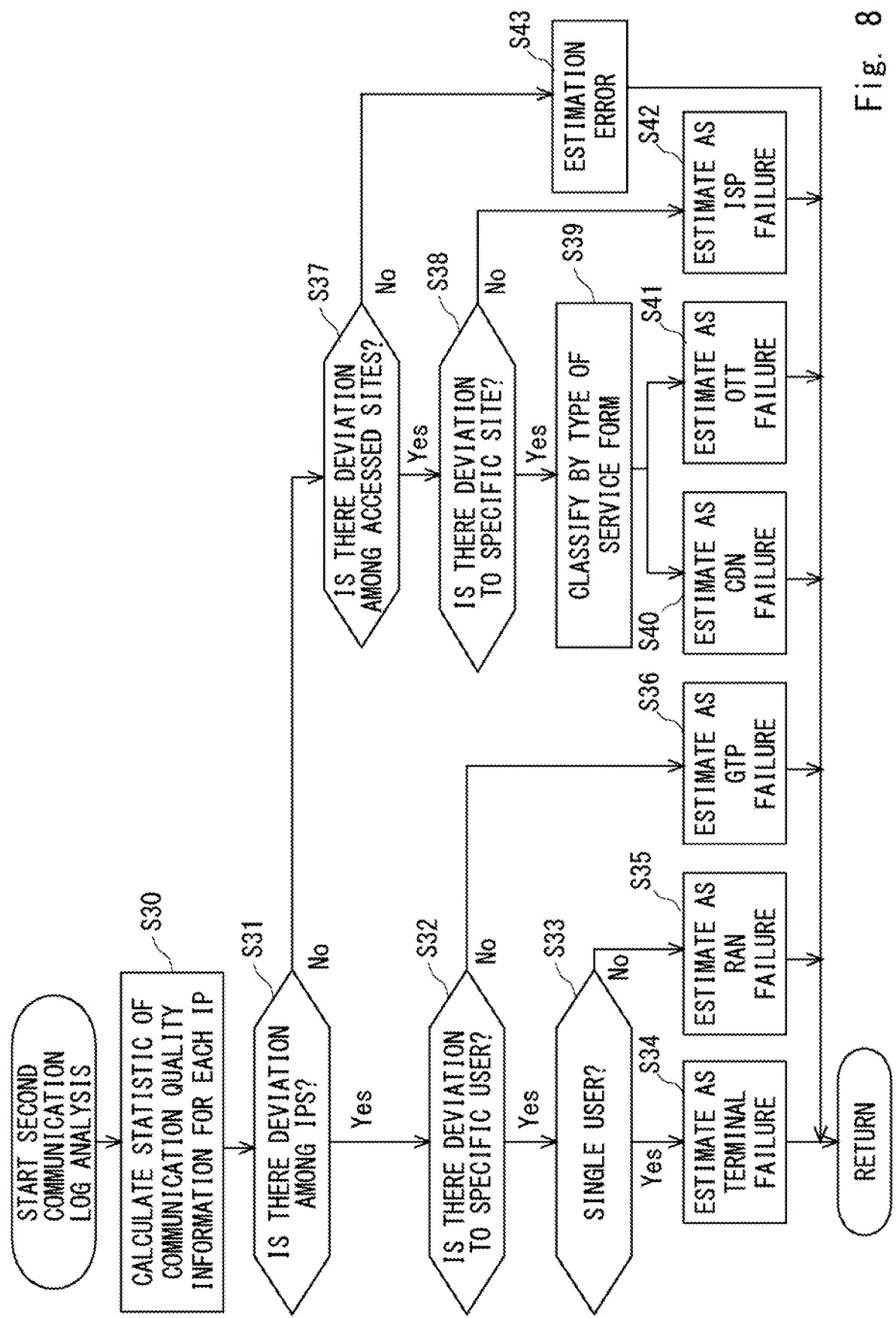
FIG. 8 is a flowchart illustrating one example of second communication log analysis processing of the failure detection device according to the second example embodiment.
Figure 9:
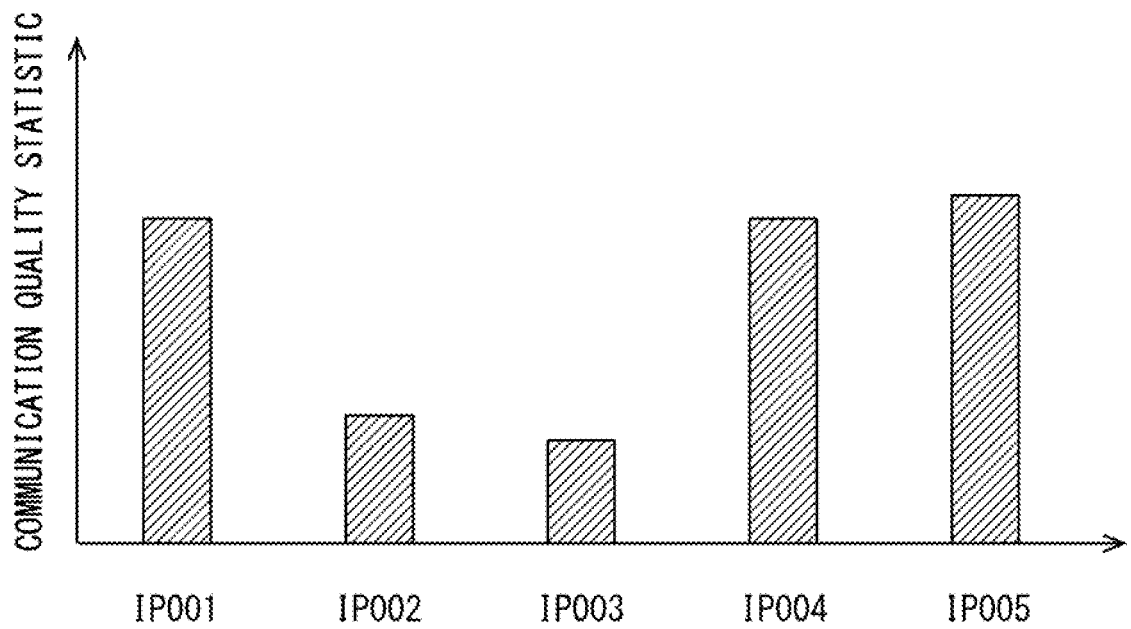
FIG. 9 is a diagram illustrating communication quality statistic for each item related to communication additional information according to the second example embodiment.
Figure 10:
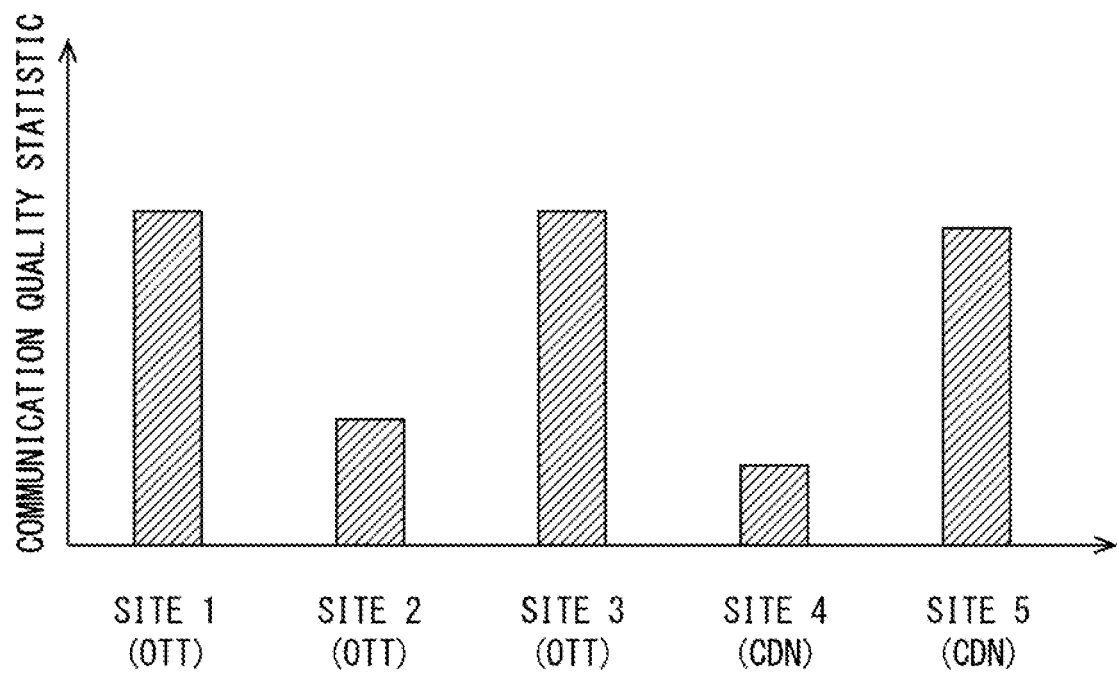
FIG. 10 is a diagram illustrating communication quality statistic for each item related to the communication additional information according to the second example embodiment.

Next, the second communication log analysis processing of the failure detecting device 20 according to the second example embodiment will be described using FIG. 8, and with reference to FIGS. 9 and 10. FIG. 8 is a flowchart illustrating one example of the second communication log analysis processing of the failure detection device 20 according to the second example embodiment. FIGS. 9 and 10 are diagrams each illustrating the communication quality statistic for each item related to the communication additional information 210 according to the second example embodiment. Note that, the item may indicate an IP address or a user when address information is included in the communication additional information 210, and may indicate a site when site identification information is included in the communication additional information 210.

First, the degradation estimation unit 26 of the failure detection device 20 calculates a communication quality statistic, which is a statistic of the communication quality information 220 of the communication log 200 for each IP address of the communication target, using the communication log 200 collected from the target relay device as a population (S30). Herein, the communication quality statistic may be a statistic relating to at least one of retransmission occurrence information, packet loss occurrence information, and throughput information of the communication quality information 220 of the communication log 200. The statistic may be a sum or an average of the performance indicators that the information represents. The IP address of the communication target may be a source IP address or a destination IP address.

Next, the degradation estimation unit 26 compares the communication quality statistics among the IP addresses of the communication targets, and determines whether there is a deviation in the communication quality statistics among the IP addresses of the communication targets (S31). Whether there is a deviation may be determined based on whether a difference between a communication quality statistic and another communication quality statistic is equal to or greater than a predetermined threshold value.

When it is determined that there is a deviation in the communication quality statistics among the IP addresses of the communication targets (Yes in S31), the degradation estimation unit 26 determines whether the deviation is due to a specific user (S32). As one example, the degradation estimation unit 26 may determine whether the IP address causing the deviation passes through a specific access point.

When it is determined that the deviation is caused by a specific user (Yes in S32), the degradation estimation unit 26 determines whether the specific user is a single user (S33). When it is determined that the user is a single user (Yes in S33), the degradation estimation unit 26 estimates that a terminal failure has occurred (S34). That is, the degradation estimation unit 26 estimates that the user terminal 1 itself of the single user is a degradation point. Meanwhile, when it is determined that a specific user is a plurality of users (No in S33), the degradation estimation unit 26 estimates that a RAN failure has occurred (S35). That is, the degradation estimation unit 26 estimates that the RAN 8 used by the plurality of users is a degradation point.

When it is determined that the deviation is not due to a specific user, that is, the deviation is due to an unspecified user (No in S32), the degradation estimation unit 26 estimates that a failure of an access control protocol such as GPRS tunneling protocol (GTP) has occurred (S36).

For example, in the example illustrated in FIG. 9, the degradation estimation unit 26 calculates a communication quality statistic for each transmission source IP address (IPs 001, 002, 003, 004, 005) of the communication additional information 210 of the communication log 200 of the target relay device. The communication quality statistics for IP 002 and IP 003 have significantly smaller values than the other IP addresses. Therefore, the degradation estimation unit 26 is able to recognize that an abnormality has occurred somewhere in the communication path of the communication transmitted from IP 002 and IP 003. Herein, it is assumed that IP 002 and IP 003 communicate with a base station of the same RAN 8-1, for example. In such a case, the degradation estimation unit 26 estimates a RAN failure with the RAN 8-1 as a degradation point.

Meanwhile, when it is determined that there is no deviation between the IP addresses of the communication targets (No in S31), the degradation estimation unit 26 calculates and compares the communication quality statistics for each accessed site with the communication log 200 collected from the target relay device as a population, and determines whether there is a deviation (S37). At this time, the degradation estimation unit 26 may perform the determination using the site URL of the communication additional information 210 of the communication log 200.

When it is determined that there is a deviation between the sites (Yes in S37), the degradation estimation unit 26 determines whether there is a deviation to the sites of a specific type (S38). For example, the degradation estimation unit 26 determines whether the site being accessed is concentrated on a site of a specific service form, that is, a site provided by the first service provision device 2*a*, the second service provision device 2*b*, or the like.

When it is determined that there is a deviation to the specific type of site (Yes in S38), the degradation estimation unit 26 classifies the specific sites, according to the type of service form (S39). When it is determined that site of the specific type is a service through the CDN, that is, the site is provided from the second service provision device 2*b*, the degradation estimation unit 26 estimates that a CDN failure has occurred (S40). Meanwhile, when it is determined that the specific type of site is a service through the OTT, that is, the site is provided from the first service provision device 2*a*, the degradation estimation unit 26 estimates that an OTT failure has occurred (S41).

Meanwhile, when it is determined that there is no deviation to the sites of the specific type, that is, there is a deviation to sites the type of which is not specified (No in S38), the degradation estimation unit 26 estimates that a failure has occurred in the ISP device 5 (S42).

Meanwhile, when it is determined that there is no deviation between the sites (No in S37), the degradation estimation unit 26 may notify the system maintainer of an error in estimation of the degradation point (S43).

Herein, in the example illustrated in FIG. 10, the degradation estimation unit 26 calculates the communication quality statistic for each site (sites 1, 2, 3, 4, and 5) using the communication quality information 220 and the site URL of the communication additional information 210 of the communication log 200 of the target relay device. The communication quality statistics for site 2 and site 4 have significantly smaller values than the other sites. The degradation estimation unit 26 is able to recognize that an abnormality has occurred somewhere in the communication path between the site 2 and the site 4 and the relay device 4. Herein, it is assumed that the site 2 and the site 4 are service sites through OTT and CDN, respectively. In such a case, the degradation estimation unit 26 estimates an ISP failure with the ISP device 5 as a degradation point.

In this manner, using the first communication log analysis, the degradation estimation unit 26 narrows down the degradation point from the communication handled by the entire relay device 4 to the communication handled by the target relay device. Then, using the second communication log analysis, the degradation estimation unit 26 compares the communication quality statistics among the items related to each of the plurality of types of the communication additional information 210. Thereby, the degradation estimation unit 26 is able to specify which communication of the user side and the Internet side the degradation point is attributable to in the communication handled by the target relay device, and further is able to specify the individual factor in the communication handled by the target relay device. In the second example embodiment, the degradation estimation unit 26 calculates the communication quality statistic for each IP address and then for each site to perform comparison between the items, but the communication quality statistic for each type of information included in the communication additional information 210 may be calculated in advance, and the comparison between the items for each type may be performed in parallel.

As described above, according to the second example embodiment, the failure recovery system 6 is able to easily estimate the degradation point of the communication quality using the communication quality information 220 of the communication log 200 included in the relay device 4 that terminates the TCP communication. Since the communication quality information 220 is an end-to-end performance index, the failure recovery system 6 is able to detect a degraded state that affects the user's experience although a clear failure has not been reached. At this time, the failure recovery system 6 is able to easily estimate the degradation point by using in combination the IP address information and the site information of the user communication that flows in a large amount. The failure recovery system 6 recognizes a sign of a failure, and may take a recovery response before the failure occurs or before receiving a report from a user.

According to the second example embodiment, since the failure recovery system 6 collects the communication logs 200 from the plurality of relay devices 4 on the communication system, it is possible to collectively manage the state of the entire communication system. As a result, it is possible to confirm the state of the entire communication system and thereafter confirm the presence or absence of an abnormal state with respect to each individual location.

Note that, the failure recovery system 6 may use the communication log 200 to analyze a user preference in addition to estimating the degradation point. This makes it possible to provide more effective services.

Third Example Embodiment

Next, a third example embodiment of the present disclosure will be described with reference to FIGS. 11 to 13. The third example embodiment is characterized in that a failure detection device of a failure recovery system selects analysis processing from plurality of kinds of analysis processing.

Figure 11:
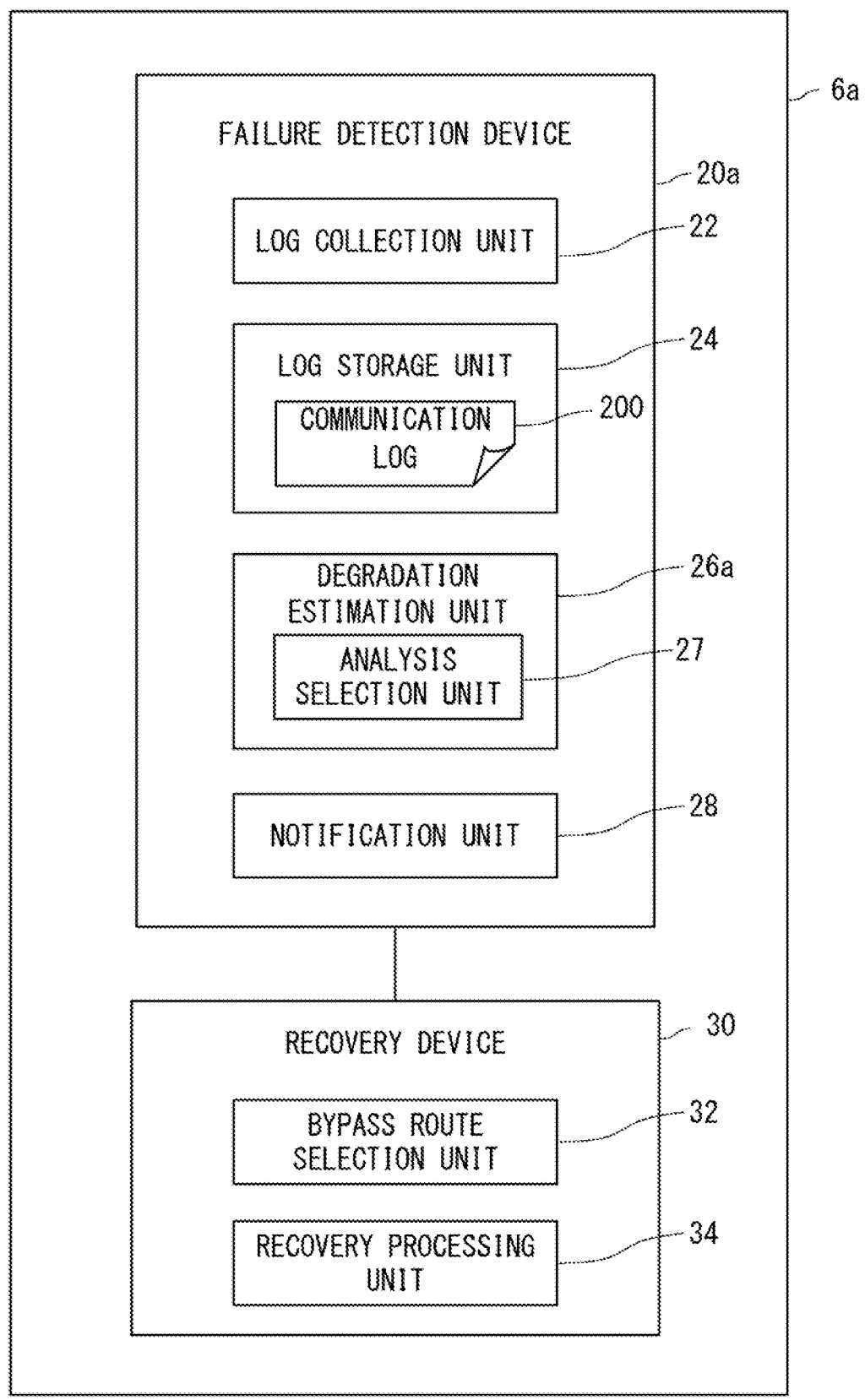
FIG. 11 is a block diagram illustrating one example of a configuration of a failure recovery system according to a third example embodiment.

FIG. 11 is a block diagram illustrating one example of a configuration of a failure recovery system 6*a* according to the third example embodiment. The failure recovery system 6*a* basically has a configuration and function similar to the failure recovery system 6 according to the second example embodiment. However, the failure recovery system 6*a* differs in that a failure detection device 20*a* is provided in place of the failure detection device 20.

The failure detection device 20*a* includes a degradation estimation unit 26*a* in place of the degradation estimation unit 26.

The degradation estimation unit 26*a* includes an analysis selection unit 27 in addition to the configuration and function of the degradation estimation unit 26.

The analysis selection unit 27 is also called an analysis selection means. The analysis selection unit 27 selects at least one first communication log analysis processing from plurality of kinds of first communication log analysis processing. The first communication log analysis processing in the third example embodiment includes first communication log analysis processing described later in addition to the first communication log analysis processing described in the second example embodiment.

Figure 12:
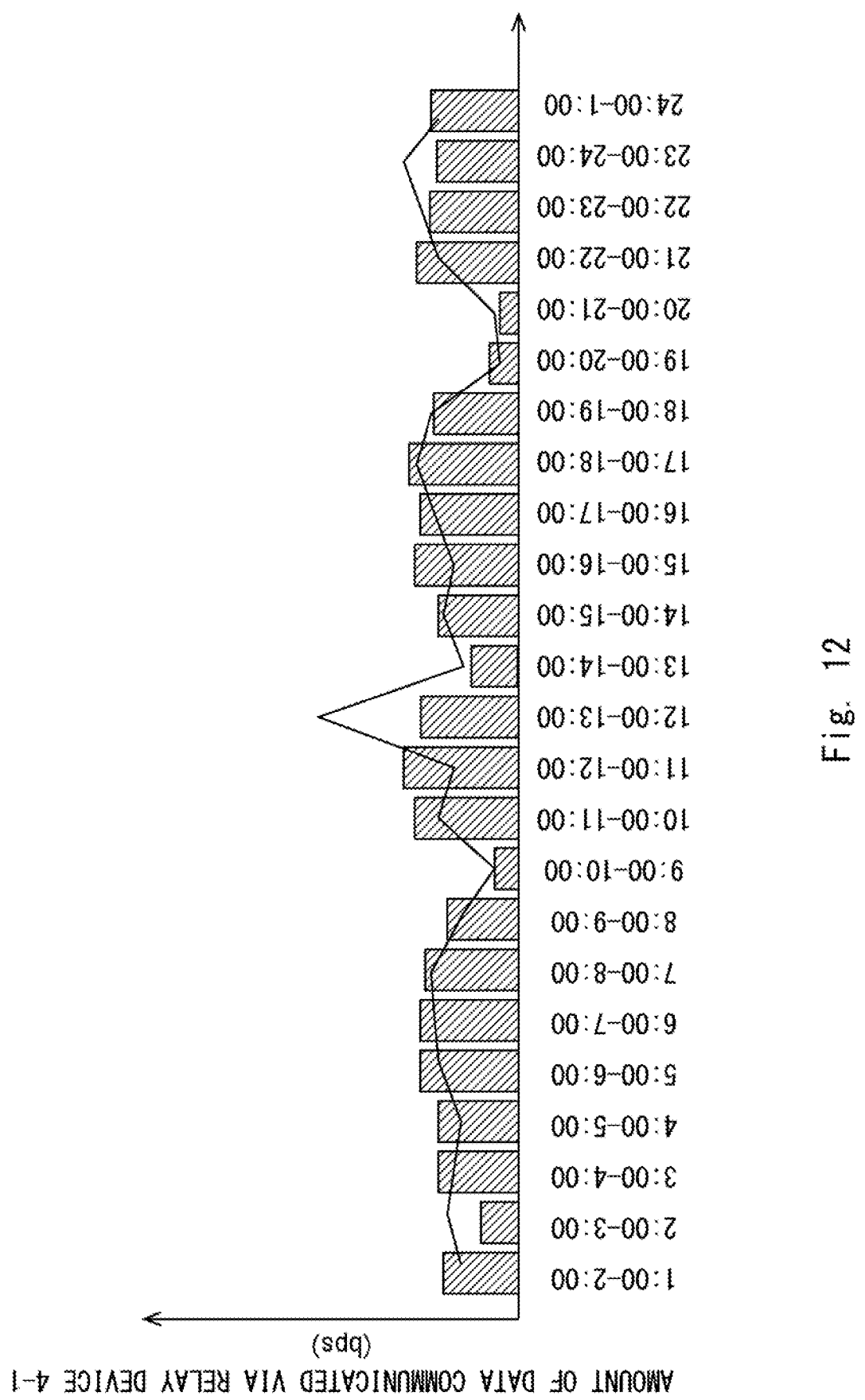
FIG. 12 is a diagram for describing one example of first communication log analysis processing according to the third example embodiment.
Figure 13:
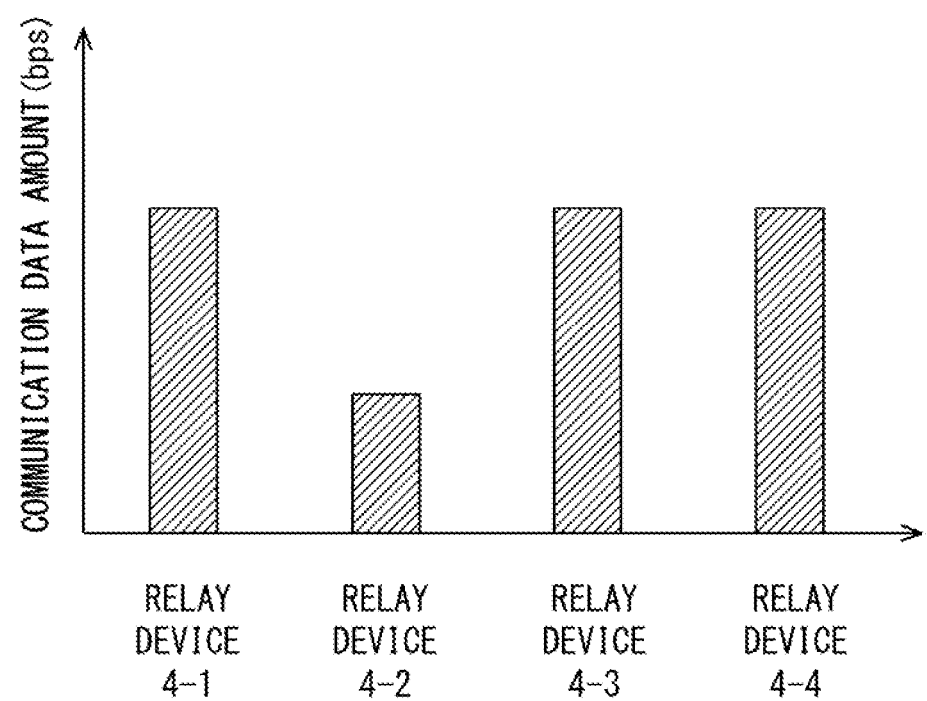
FIG. 13 is a diagram for describing one example of the first communication log analysis processing according to the third example embodiment.

FIGS. 12 and 13 are diagrams each for describing one example of the first communication log analysis processing according to the third example embodiment. In FIG. 12, a bar graph illustrates the amount of data (traffic) of communication handled by a relay device 4-1 for each time zone in a designated period, and a solid line illustrates past traffic for each time zone. In the example illustrated in FIG. 12, the degradation estimation unit 26*a* calculates, for each of the relay devices 4 on the communication system, traffic passing through the relay device 4 in a designated period for each time zone, and compares the calculated traffic with past traffic in the same time zone. When there is a time zone in which the traffic in the designated period is significantly deviated from the past traffic, the degradation estimation unit 26*a* specifies the relay device 4 as the target relay device, and specifies the time zone as an analysis target period T.

FIG. 13 illustrates traffic passing through the relay device 4 for each relay device 4. In the example illustrated in FIG. 13, the degradation estimation unit 26*a* calculates the traffic of the analysis target period T for each relay device 4, and compares the traffic among the relay devices 4. When there is a relay device 4 that is significantly deviated from the other relay devices 4, the degradation estimation unit 26*a* specifies the deviated relay device 4 as the target relay device.

As described above, the degradation estimation unit 26*a* includes plurality of kinds of processing as the first communication log analysis processing. The analysis selection unit 27 selects at least one first communication log analysis processing among the plurality of types of processing. The degradation estimation unit 26*a* specifies the relay device 4 having the communication quality degraded state by executing the selected first communication log analysis processing. As a result, the degradation estimation unit 26*a* is able to execute optimal analysis processing according to the situation. Further, the degradation estimation unit 26*a* is able to analyze the degraded state from multiple viewpoints by combining plurality of analysis processing.

Note that, in the second and third example embodiments, the failure recovery systems 6 and 6*a* are connected to the relay device 4, but may be incorporated in the user terminal 1 or the service provision device 2 of the transmission source, the relay device 4 itself, or other data relay devices. In such case, the failure recovery systems 6 and 6*a* may transmit an optimal amount of data according to the communication with the communication destination device, based on the analysis result. This makes it possible to perform communication effectively using the required bandwidth.

In the first to third example embodiments described above, a computer is configured by a computer system including a personal computer, a word processor, and the like. However, the present invention is not limited to such configuration, and the computer may be configured by a server of a local area network (LAN), a host of computer (personal computer) communication, a computer system connected on the Internet, and the like. It is also possible to distribute the functions among devices on the network and configure the computer with the entire network.

Although the disclosure has been described as a hardware configuration in the first to third example embodiments described above, the disclosure is not limited to this. The disclosure may also be implemented by causing a processor 1010, which will be described later, to execute a computer program to perform various types of processing such as the failure detection processing and recovery processing described above.

Figure 14:
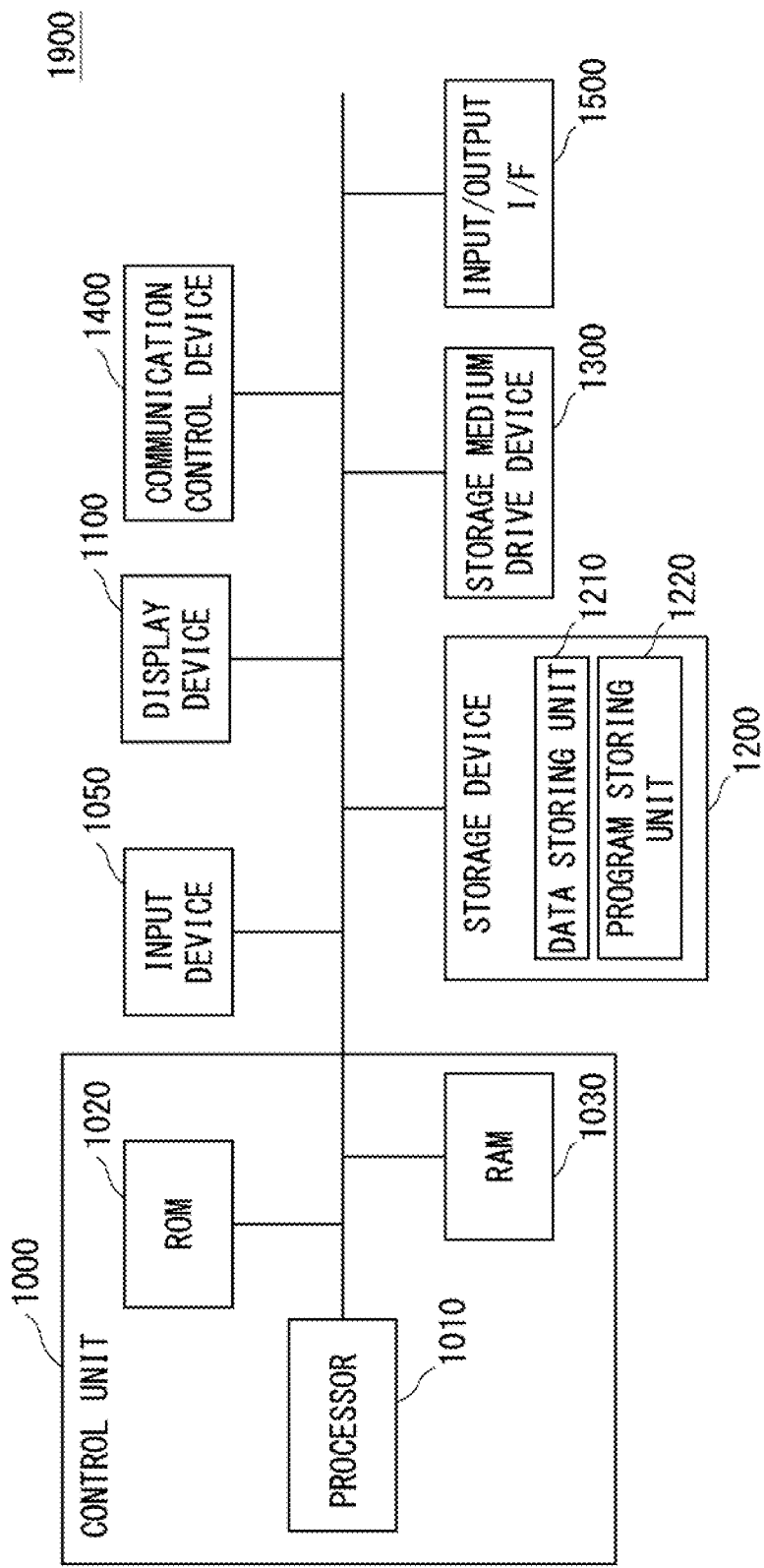
FIG. 14 is a schematic configuration diagram of a computer according to the first to third example embodiments.

FIG. 14 is one example of a configuration diagram of a computer 1900 according to the first to third example embodiments. As illustrated in FIG. 14, the computer 1900 includes a control unit 1000 for controlling the entire system. An input device 1050, a display device 1100, a storage device 1200, a storage medium drive device 1300, a communication control device 1400, and an input/output I/F 1500 are connected to the control unit 1000 via a bus line such as a data bus.

The control unit 1000 includes the processor 1010, a ROM 1020, and a RAM 1030.

The processor 1010 performs various types of information processing and control according to programs stored in various storage units such as the ROM 1020 and the storage device 1200.

The ROM 1020 is a read-only memory in which various programs and data for the processor 1010 to perform various controls and calculations are stored in advance.

The RAM 1030 is a random-access memory used as a working memory for the processor 1010. Various areas for performing various processing according to the first to third example embodiments can be secured in the RAM 1030.

The input device 1050 is an input device that receives input from a user such as a keyboard, a mouse, and a touch panel. For example, on the keyboard, various keys such as a ten-key pad, function keys for executing various functions, and cursor keys are arranged. The mouse is a pointing device, and is an input device for designating a corresponding function by clicking on a key, an icon, or the like displayed on the display device 1100. The touch panel is an input apparatus arranged on the surface of the display device 1100, which specifies a position touched by a user, the position associated with various operation keys displayed on the screen of the display device 1100, and accepts an input of an operation key displayed in association with the touch position.

As the display device 1100, for example, a CRT, a liquid crystal display, or the like is used. The display device is configured to display input results by a keyboard or a mouse, and display finally retrieved image information. The display device 1100 displays an image of operation keys for performing various necessary operations from the touch panel, according to various functions of the computer 1900.

The storage device 1200 includes a readable/writable storage medium and a drive device for reading/writing various information such as a program and data from/to the storage medium.

Although a hard disk or the like is mainly used as a storage medium used in the storage device 1200, a non-transitory computer readable medium used in a storage medium drive device 1300 described later may also be used.

The storage device 1200 includes a data storing unit 1210, a program storing unit 1220, other storage units (not illustrated) (for example, a storage unit for backing up a program, data, or the like stored in the storage device 1200), and the like. The program storing unit 1220 stores a program for implementing various processing of the first to third example embodiments. The data storing unit 1210 stores various data of various databases according to the first to third example embodiments.

The storage medium drive device 1300 is a drive device for the processor 1010 to read a computer program, data including a document, and the like from a storage medium in the outside (external storage medium).

Herein, the external storage medium refers to a non-transitory computer readable medium in which a computer program, data, and the like are stored. Non-transitory computer readable media include various types of tangible storage media. Examples of non-transitory computer readable media include magnetic recording media (e.g., flexible disk, magnetic tape, hard disk drive), magneto-optical recording media (e.g., magneto-optical disk), CD-read only memory (ROM), CD-R, CD-R/W, semiconductor memory (e.g., mask ROM, programmable ROM (PROM), erasable PROM (EPROM), flash ROM, random-access memory (RAM)). The various programs may also be supplied to the computer by various types of transitory computer readable media. Examples of transitory computer readable media include electrical signals, optical signals, and electromagnetic waves. The transitory computer readable medium is able to supply various programs to the computer via a wired communication path such as an electric wire and an optical fiber or a wireless communication path, and the storage medium drive device 1300.

That is, in the computer 1900, the processor 1010 of the control unit 1000 reads various programs from an external storage medium set in the storage medium drive device 1300, and stores the programs in the respective units of the storage device 1200.

When the computer 1900 executes various processing, the computer 1900 reads a corresponding program from the storage device 1200 into the RAM 1030 and executes the program. However, the computer 1900 is also able to directly read a program from an external storage medium to the RAM 1030 by the storage medium drive device 1300, instead of from the storage device 1200, and execute the program. Depending on the computer, various programs and the like may be stored in the ROM 1020 in advance and executed by the processor 1010. Further, the computer 1900 may download various programs and data from another storage medium via the communication control device 1400, and execute the various programs and data.

The communication control device 1400 is a control device for network connection between the computer 1900 and various external electronic apparatuses such as another personal computer and a word processor. The communication control device 1400 makes it possible to access the computer 1900 from such various external electronic apparatuses.

The input/output I/F 1500 is an interface for connecting various input/output devices via a parallel port, a serial port, a keyboard port, a mouse port, and the like.

Note that, as the processor 1010, a central processing unit (CPU), a graphics processing unit (GPU), a field-programmable gate array (FPGA), a digital signal processor (DSP), an application specific integrated circuit (ASIC), or the like may be used. In addition, a plurality of such units may be used in parallel.

The order of execution of each processing in the systems and methods described in the claims, the description, and the drawings is not expressly specified as [before], [prior to], and the like, and may be implemented in any order unless the output of the preceding processing is used in the subsequent processing. The operation flow in the claims, the description, and the drawings is described using [first], [next], and the like for the sake of convenience, but does not imply that it is necessary to carry out the operations in this order.

While the present disclosure has been described above with reference to example embodiments thereof, the present disclosure is not limited to the example embodiments. It will be understood by those of ordinary skill in the art that various changes in form and details may be made in the present disclosure without departing from the scope of the invention.

This application is based upon and claims the benefit of priority from Japanese Patent Application No. 2020-092028, filed on May 27, 2020, the disclosure of which is incorporated herein in its entirety by reference.

INDUSTRIAL APPLICABILITY

The failure detection device according to the present disclosure can be used for detecting a failure in a network.

REFERENCE SIGNS LIST

1 USER TERMINAL
2 SERVICE PROVISION DEVICE
2a FIRST SERVICE PROVISION DEVICE
2b SECOND SERVICE PROVISION DEVICE
4 RELAY DEVICE
6 FAILURE RECOVERY SYSTEM
5 INTERNET SERVICE PROVIDER (ISP) DEVICE
7 INTERNET
8 RADIO ACCESS NETWORK (RAN)
9 CORE NETWORK (CN)
10, 20, 20a FAILURE DETECTION SYSTEM (FAILURE DETECTION DEVICE)
12, 22 LOG COLLECTION UNIT
16, 26, 26a DEGRADATION ESTIMATION UNIT
24 LOG STORAGE UNIT
27 ANALYSIS SELECTION UNIT
28 NOTIFICATION UNIT
30 RECOVERY DEVICE
32 BYPASS ROUTE SELECTION UNIT
34 RECOVERY PROCESSING UNIT
200 COMMUNICATION LOG
210 COMMUNICATION ADDITIONAL INFORMATION
220 COMMUNICATION QUALITY INFORMATION
1000 CONTROL UNIT
1010 PROCESSOR
1020 ROM
1030 RAM
1050 INPUT DEVICE
1100 DISPLAY DEVICE
1200 STORAGE DEVICE
1210 DATA STORING UNIT
1220 PROGRAM STORING UNIT
1300 STORAGE MEDIUM DRIVE DEVICE
1400 COMMUNICATION CONTROL DEVICE
1500 INPUT/OUTPUT I/F
1900 COMPUTER

The invention claimed is:
1. A failure detection system comprising:
at least one memory storing instructions, and
at least one processor configured to execute the instructions to:

collect a communication log including communication quality information from a relay device that terminates transmission control protocol (TCP) communication, wherein the communication log further includes communication additional information including at least address information of a communication target, the communication target being a transmission source or a destination;

estimate, by using the communication quality information of the communication log, a degradation point indicating where a communication quality degradation factor exists in a communication path passing through the relay device;

determine whether there is a deviation in statistics of the communication quality information among address information of communication targets;

estimate, based on there being the deviation due to a plurality of specific users, that a radio access network used by the plurality of specific users is the degradation point; and estimate, based on there being the deviation due to an unspecified user, that a failure of an access control protocol has occurred.

2. The failure detection system according to claim 1, wherein the communication quality information includes at least one of retransmission occurrence information, packet loss occurrence information, and throughput information.

3. The failure detection system according to claim 1, wherein
the communication additional information further includes identification information of accessed sites, and
the at least one processor is further configured to execute the instructions to:
determine whether there is the deviation in statistics of the communication quality information between the accessed sites;
estimate, when there is the deviation between the accessed sites of a specific type, that a failure corresponding to the accessed sites of the specific type has occurred; and
estimate, when there is the deviation between the accessed sites of an unspecified type, that an internet service provider device is the degradation point.

4. The failure detection system according to claim 1, wherein
the at least one processor is further configured to execute the instructions to:
collect the communication log from a plurality of the relay device,
specify, by using the communication log, a degraded relay device in a communication quality degraded state, from among the plurality of the relay devices; and
estimate, by using the communication log, the degradation point in the communication path passing through the degraded relay device.

5. The failure detection system according to claim 4, wherein the at least one processor is further configured to execute the instructions to:
select at least one piece of analysis processing from a plurality of kinds of analysis processing, and
specify the degraded relay device by executing the at least one piece of analysis processing.

6. A failure recovery system comprising:
a failure detection device comprising:
at least one first memory storing instructions, and
at least one first processor configured to execute the instructions to:
collect a communication log including communication quality information from a relay device that terminates transmission control protocol (TCP) communication, wherein the communication log further includes communication additional information including at least address information of a communication target, the communication target being a transmission source or a destination; and
estimate, by using the communication quality information of the communication log, a degradation point indicating where a communication quality degradation factor exists in a communication path passing through the relay device;
determine whether there is a deviation in statistics of the communication quality information among address information of communication targets;
estimate, based on there being the deviation due to a plurality of specific users, that a radio access network used by the plurality of specific users is the degradation point; and
estimate, based on there being the deviation due to an unspecified user, that a failure of an access control protocol has occurred;
a failure recovery device comprising:
at least one second memory storing instructions, and
at least one second processor configured to execute the instructions to:
switch the communication path to a bypass route that does not pass through the degradation point.

7. The failure recovery system according to claim 6, wherein the communication quality information includes at least one of retransmission occurrence information, packet loss occurrence information, and throughput information.

8. A failure detection method comprising:
collecting a communication log including communication quality information from a relay device that terminates transmission control protocol (TCP) communication, wherein the communication log further includes communication additional information including at least address information of a communication target, the communication target being a transmission source or a destination;
estimating, by using the communication quality information of the communication log, a degradation point indicating where a communication quality degradation factor exists in a communication path passing through the relay device;
determine whether there is a deviation in statistics of the communication quality information among address information of communication targets;
estimate, based on there being the deviation due to a plurality of specific users, that a radio access network used by the plurality of specific users is the degradation point; and
estimate, based on there being the deviation due to an unspecified user, that a failure of an access control protocol has occurred.

* * * * *